Sept. 16, 1969     L. J. WINDECKER     3,467,345

FOAM PLASTIC FLOAT AND METHOD FOR THE PREPARATION THEREOF

Filed Sept. 29, 1967

INVENTOR.
Leo J. Windecker
BY
AGENT

United States Patent Office 3,467,345
Patented Sept. 16, 1969

3,467,345
FOAM PLASTIC FLOAT AND METHOD FOR THE PREPARATION THEREOF
Leo J. Windecker, Midland, Tex., assignor to The Dow Chemical Company, Midland, Mich., a corporation of Delaware
Filed Sept. 29, 1967, Ser. No. 671,793
Int. Cl. B64c 25/54; B63b 1/18, 5/24
U.S. Cl. 244—105           5 Claims

ABSTRACT OF THE DISCLOSURE

A foam plastic float is provided with struts attached by means of high strength filaments dispersed through the foam plastic of the float and adhered thereto.

---

Figure 1:
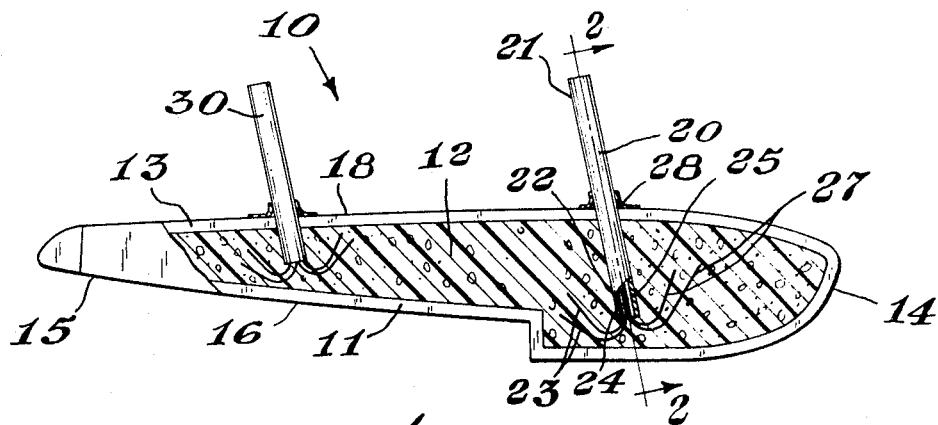

This invention relates to a foam plastic float and to a method for the preparation thereof, and more particularly relates to a foam plastic float and a method for the preparation thereof wherein the foam plastic float is affixed to an impact receiving strut member.

Flotation bodies and generally similar structural elements are desirably prepared employing a foam plastic core particularly of the closed cell variety and having an impact resistant, high strength skin disposed about the foam plastic core. Such flotation members are sturdy and remarkably resistant to puncture if a closed cell is employed for the core material. Puncture of the high strength skin and limited damage to the core reduces the flotation characteristics only in the region of the immediate damage, and due to the closed cell nature of the core material, the overall flotation characteristics are maintained. This is particularly desirable in aircraft floats, hydrofoils and the like. Such floats or foam core structures are particularly desirable. However, difficulty has been encountered in attaching such floats to associated structures. Inherently, because of their light weight and cellular nature, highly localized stresses such as are obtained when an aircraft float contacts a body of water on landing or impact such as is received by a hydrofoil in choppy water or when striking a floating or submerged body, often tends to fracture the high tensile skins and perforate the cores. Various methods of reinforcing have been employed in attempts to distribute the shock load. Oftentimes, this has resulted in structures which are undesirably heavy because of complex internal and/or external reinforcing.

It would be desirable if there were available an improved float structure of light weight having means of mechanical attachment secured thereto.

It would also be desirable if there were available an improved aircraft float having a foamed plastic core and a rigid skin and a light weight means of attachment thereto.

It would also be desirable if there were available an improved foam plastic composite structure having means of mechanical attachment which was of high strength and resistant to shock loading.

It would also be desirable if there were available a method for the preparation of such a product.

These benefits and other advantages in accordance with the present invention are achieved in a foam plastic flotation body comprising a foamed resinous core, a rigid and beneficially reinforced skin adhered thereto and conforming generally to the core, at least one strut member forming a means of attachment and secured to the float, the improvement which comprises the strut member passing into the flotation body and into the foamed core, the strut member having a core end and an external end, a plurality of filamentary reinforcing members affixed to the core end of the strut, the filamentary reinforcing members having a first end secured to the strut and second ends disposed remotely from the strut, the second ends being distributed within the foam body and adhered thereto.

Also contemplated within the scope of the present invention is a method for the preparation of an improved flotation body having a mechanical attachment means subject to impact loading, the method comprising forming a flotation body having a foamed synthetic resinous core and a rigid external skin, disposing within the flotation body a strut, affixing a plurality of filamentary reinforcing elements to the strut by means of first ends of said elements, disposing second ends of said elements remote from the strut and spread out within the foamed body and adhering the second ends of the reinforcing elements to the foamed body.

Figure 2:
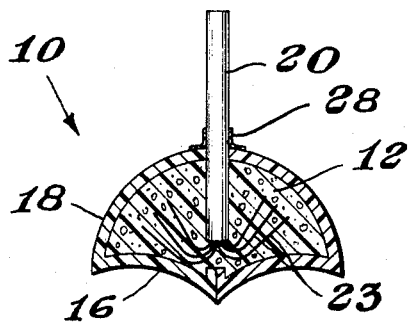
Figure 3:
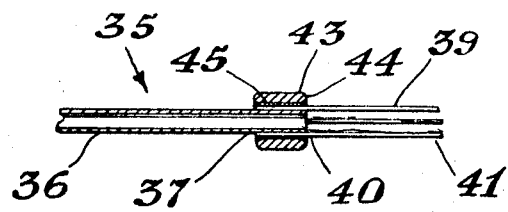
Figure 4:
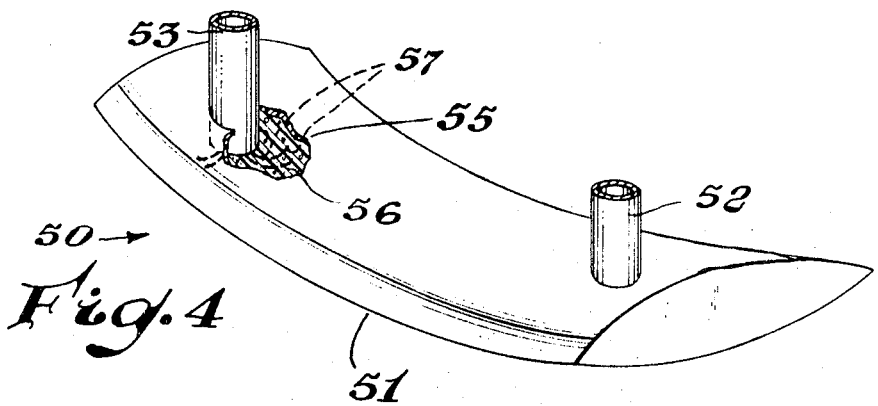

Further features and advantages of the present invention will become more apparent from the following specification when taken in connection with the drawing wherein:

FIGURE 1 is a sectional view of a flotation body in accordance with the present invention.
FIGURE 2 is a sectional view of the body of FIGURE 1 taken along the line 2—2 thereof.
FIGURE 3 depicts a means of fixing filamentary reinforcing elements to a strut.
FIGURE 4 depicts a view of a hydrofoil in accordance with the present invention.

In FIGURE 1 there is depicted a sectional view of a flotation body in accordance with the invention generally designated by the reference numeral 10. The flotation body 10 is an aircraft float. The aircraft float has a high strength skin 11 and a foamed core 12. The skin 11 and the foam plastic core 12 are adhered together by suitable means, not shown. The skin 11 defines a peripheral inwardly extending flange 13. The float 10 has a first or front end 14 and a second or rear end 15. The float 10 has a lower or water edge portion 16 and an upper portion 18. A first strut or means of mechanical attachment 20 is disposed generally adjacent the first end 14. The strut 20 has a first or external end 21 and a second or internal end 22. Beneficially, the strut 20 has a hollow tubular configuration. A plurality of high strength filamentary reinforcing elements 23 are affixed to the strut 20 by means of first ends 24 which extend within the strut 20 and are secured therein by a suitable securing means such as an adhesive 25. The reinforcing filaments 23 have a plurality of second ends 27 remotely disposed from the strut 20. The second ends 27 extend generally upwardly and outwardly from the lower portion of the float and extend into the foam core 12. The reinforcing filaments are bonded or adhered to the strut 20 by a suitable adhesive, not shown. The strut 20 is adhered to the upper portion of the float 18 by means of adhesive and reinforcement generally designated by the reference numeral 28. A strut assembly 30 is secured within the float 10 in a manner similar to the strut 20.

In FIGURE 2 there is depicted a sectional view of the body 10 taken along the line 2—2 of FIGURE 1 showing the strut 20, the filamentary reinforcing elements 23, the foam core 12 and the manner in which the reinforcing elements 23 extend generally upwardly and outwardly from the lower portion 16 of the float 10 toward the upper portion 18.

In FIGURE 3 there is depicted a strut or attaching assembly generally designated by the reference numeral 35. The assembly 35 comprises a strut 36 having a foam engaging end 37. The foam engaging end 37 has disposed thereabout a plurality of filamentary reinforcing elements 39. The elements 39 have a first end 40 and a second end 41. The first end 40 of the elements 39 are adjacent an external surface of the second end 37 and are restrained by a generally annular configuration 43. The annular configuration 43 has a curved edge 44 disposed toward the reinforcing elements 39. Beneficially, an adhesive 45 secures the reinforcing elements and the annular ring 43 to the foam engaging end 37 of the strut 36.

In FIGURE 4 there is depicted a hydrofoil assembly generally designated by the reference numeral 50. The assembly 50 comprises a hydrofoil 51 having secured thereto a first strut 52 and a second strut 53. The hydrofoil 51 comprises a rigid skin 55, a foam core 56. A plurality of reinforcing elements 57 are affixed to the strut 53 and secured to the foam core 56 in a manner generally similar to that depicted in FIGURES 1 and 2.

Flotation bodies in accordance with the present invention are readily prepared from a wide variety of materials. Particularly desirable for the foam flotation core are rigid foamed plastics such as foamed polystyrene, foamed polyurethanes, foamed phenol-formaldehyde and the like. Beneficially, the skin or external surface may be formed from sheet metal or more advantageously, from glass fiber reinforced plastics such as polyesters and epoxy resins.

In fabricating bodies in accordance with the present invention, the foam core may be molded, a skin subsequently applied thereto; or alternately, the skin may be formed, the foam plastic core inserted in one or more places and adhered thereto; or a hardenable foamable composition may be added to the shell formed by the skin and the composition permitted to foam and harden. A variety of means of attachment of filamentary reinforcing agents to supporting elements such as a strut may be employed.

As indicated in FIGURE 1, a bundle of reinforcing elements such as filamentary glass roving may be disposed in one end of the strut and adhered therein with an epoxy resin. Alternately, the reinforcing elements may be positioned about the strut and maintained in place by a clamp such as that depicted in FIGURE 3, or alternately, by means of binding with roving which is subsequently saturated with adhesive such as an epoxy resin. Generally, due to the limited depth of many flotation structures such as aircraft floats or hydrofoils, the filamentary reinforcing is disposed in the manner depicted in FIGURES 1 and 3 wherein the reinforcing projects away from the strut itself and is then folded back toward the strut or similar supporting member. In this manner, the maximum depth of the foam core is engaged by the reinforcing filaments. One beneficial manner of preparing such floats is to prepare right and left halves of a float skin or shell, positioning the strut partially within one half of the float, temporarily securing the ends of the reinforcing filaments remote from the strut to the float half either by means of a hardening adhesive or a pressure sensitive tape, coating the reinforcing filaments with a hardening adhesive, adding a foamable hardenable material to the shell formed by two float halves, permitting the material to foam and harden. Polyurethane foamable compositions are particularly advantageous in that they foam and harden relatively rapidly. When the filamentary reinforcing material is coated with an epoxy adhesive, the foam forms around the adhesive coated reinforcing elements, hardens, subsequently the epoxy resin hardens and a rigid structure is obtained. Beneficially, glass roving and epoxy resins are employed to provide a connection such as the joint reinforcement 28 between the shell 13 and the strut 20.

The particular components employed in fabricating flotation bodies in accordance with the invention are dependent on the type of service required. For many uses where maximum strength, corrosion resistance and impact resistance are desired, the reinforcing filaments employed are glass roving, the skin material glass reinforced epoxy resin, and foamed core polyurethanes of the rigid variety.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:
1. A foam plastic body comprising
   a foamed resinous core,
   a rigid skin adhered thereto and conforming generally to the core,
   at least one strut member forming a means of attachment and secured to the body, the improvement which comprises
   the strut member passing into the body and into the formed core, the strut member having
   a core end and
   an external end,
   a plurality of filamentary reinforcing members affixed to the core end of the strut, the filamentary reinforcing members having
   a first end secured to the strut and
   a second end disposed remotely from the strut, the second ends being distributed within the foam body and adhered thereto.

2. The body of claim 1 wherein the body is an aircraft float.

3. The body of claim 1 wherein the body has an upper portion and a lower portion, the core end of the strut passes through the upper portion and terminates adjacent the lower portion and the filamentary reinforcing members extend upwardly and outwardly from the core end of the strut.

4. The body of claim 1 wherein the rigid skin is a reinforced plastic skin.

5. The body of claim 1 wherein the body is a hydrofoil.

References Cited

UNITED STATES PATENTS

| | | | |
|---|---|---|---|
| 2,121,052 | 6/1938 | Roberts et al. | 114—66.5 |
| 3,063,398 | 11/1962 | Yohe | 244—105 X |
| 3,208,421 | 9/1965 | Landes et al. | 244—105 X |
| 3,273,833 | 9/1966 | Windecker | 244—123 |
| 3,380,425 | 4/1968 | Wilson | 9—310 X |

MILTON BUCHLER, Primary Examiner

PAUL E. SAUBERER, Assistant Examiner

U.S. Cl. X.R.

9—1, 6; 52—707; 114—66.5